United States Patent
Hardy et al.

(10) Patent No.: US 9,908,507 B2
(45) Date of Patent: Mar. 6, 2018

(54) EXTENSION OF A VEHICULAR ALARM TO ACCESSORIES AND EQUIPMENT CARRIED BY AN AUTOMOBILE

(71) Applicant: Neris Holdings, LLC, Salt Lake City, UT (US)

(72) Inventors: James L. Hardy, North Salt Lake City, UT (US); Joseph M. Graham, Farmington, UT (US)

(73) Assignee: NERIS HOLDINGS, LLC, Salt Lake City, UT (US)

( * ) Notice: Subject to any disclaimer, the term of this patent is extended or adjusted under 35 U.S.C. 154(b) by 66 days.

(21) Appl. No.: 14/832,999

(22) Filed: Aug. 21, 2015

(65) Prior Publication Data
US 2016/0052490 A1    Feb. 25, 2016

Related U.S. Application Data

(60) Provisional application No. 62/040,384, filed on Aug. 21, 2014.

(51) Int. Cl.
*B60Q 1/00* (2006.01)
*B60R 25/10* (2013.01)

(52) U.S. Cl.
CPC ......... *B60R 25/1001* (2013.01); *B60R 25/10* (2013.01)

(58) Field of Classification Search
CPC ......... B60N 2/002; B60N 2/26; B60R 99/00; B60R 25/102; B60R 25/101; B60Q 9/00
USPC ............. 340/457, 667, 573.1, 426.15, 426.2, 340/426.25, 426.1, 426.24, 426.16
See application file for complete search history.

(56) References Cited

U.S. PATENT DOCUMENTS

| | | | | |
|---|---|---|---|---|
| 5,739,747 A | * | 4/1998 | Flick | B60R 25/102 307/10.2 |
| 6,922,147 B1 | * | 7/2005 | Viksnins | B60N 2/002 180/272 |
| 7,079,016 B2 | * | 7/2006 | Ho | G08B 21/22 180/273 |
| 7,218,211 B2 | * | 5/2007 | Ho | G08B 21/24 180/273 |
| 7,250,869 B2 | * | 7/2007 | Davis | B60N 2/26 340/539.11 |

(Continued)

*Primary Examiner* — Hoi Lau
(74) *Attorney, Agent, or Firm* — Durham Jones & Pinegar, P.C. Intellectual Property Law Group

(57) ABSTRACT

A system for extending a vehicular alarm system includes a base unit and a remote unit. The system is configured to extend the vehicular alarm system to an accessory or equipment secured to, carried by (e.g., outside or inside) or in proximity to an automobile and/or to equipment secured to the accessory. The base unit is configured to be carried by the automobile and to communicate with the vehicular alarm system. The base unit may be configured to mimic activation of a sensor of the vehicular alarm system in a manner that can activate the vehicular alarm system. The remote unit is configured to be carried by the accessory, and may sense removal of the accessory from the automobile, opening of the accessory and/or removal of equipment from the accessory. Methods for extending a vehicular alarm system to operate with one or more accessories are also disclosed, as are methods for detecting and providing an alarm when an accessory or equipment secured by the accessory is undesirably disturbed.

27 Claims, 2 Drawing Sheets

(56) References Cited

U.S. PATENT DOCUMENTS

| | | | | |
|---|---|---|---|---|
| 7,348,877 B2* | 3/2008 | Chen | | B60R 25/102 |
| | | | | 340/425.5 |
| 7,786,852 B2* | 8/2010 | Kautz | | B60N 2/002 |
| | | | | 340/425.5 |
| 8,058,983 B1* | 11/2011 | Davisson | | G08B 21/0205 |
| | | | | 340/10.1 |
| 8,063,788 B1* | 11/2011 | Morningstar | | B60N 2/002 |
| | | | | 180/271 |
| 8,970,362 B2* | 3/2015 | Morley | | B60N 2/002 |
| | | | | 340/438 |
| 9,165,451 B1* | 10/2015 | Wilson | | G08B 21/0205 |
| 9,227,484 B1* | 1/2016 | Justice | | B60N 2/002 |
| 2005/0030188 A1* | 2/2005 | Flanagan | | B60R 99/00 |
| | | | | 340/667 |
| 2006/0139159 A1* | 6/2006 | Lee | | B60N 2/002 |
| | | | | 340/457 |
| 2007/0152502 A1* | 7/2007 | Kinsey | | H02J 1/14 |
| | | | | 307/10.1 |
| 2007/0241869 A1* | 10/2007 | Kalous | | B60Q 1/305 |
| | | | | 340/431 |
| 2007/0262853 A1* | 11/2007 | Bradus | | B60R 25/1004 |
| | | | | 340/426.25 |
| 2007/0268119 A1* | 11/2007 | Cram | | B60Q 9/00 |
| | | | | 340/457 |
| 2008/0238643 A1* | 10/2008 | Malen | | B60Q 9/00 |
| | | | | 340/438 |
| 2009/0072956 A1* | 3/2009 | Kalous | | B60Q 1/305 |
| | | | | 340/431 |
| 2010/0042285 A1* | 2/2010 | Abernethy, Jr. | | G09F 9/30 |
| | | | | 701/31.4 |
| 2011/0254381 A1* | 10/2011 | Gramlich | | B60D 1/62 |
| | | | | 307/117 |
| 2015/0367886 A1* | 12/2015 | Lavoie | | B62D 15/0275 |
| | | | | 701/41 |
| 2016/0052490 A1* | 2/2016 | Hardy | | B60R 25/1001 |
| | | | | 340/426.1 |
| 2016/0210757 A1* | 7/2016 | Lavoie | | B62D 13/00 |
| 2016/0280258 A1* | 9/2016 | Lavoie | | B62D 6/10 |

* cited by examiner

EXTENSION OF A VEHICULAR ALARM TO ACCESSORIES AND EQUIPMENT CARRIED BY AN AUTOMOBILE

CROSS-REFERENCE TO RELATED APPLICATION

A claim to the benefit of the Aug. 21, 2014, filing date of U.S. Provisional Patent Application No. 62/040,384, titled EXTENSION OF A VEHICULAR ALARM TO ACCESSORIES AND EQUIPMENT CARRIED BY AN AUTOMOBILE ("the '384 Provisional Application"), is hereby made pursuant to 35 U.S.C. § 119(e). The entire disclosure of the '384 Provisional Application is hereby incorporated by reference.

TECHNICAL FIELD

This disclosure relates generally to alarm systems for automobiles, or vehicular alarm systems. More specifically, this disclosure relates to systems for extending a vehicular alarm system to one or more accessories that have been secured to or that are in proximity to an automobile and/or to equipment carried by the automobile or by an accessory that has been secured to or that is in proximity to the automobile. This disclosure also relates to methods for extending a vehicular alarm system to an accessory and/or to equipment carried by an automobile, and to methods for detecting undesired disturbances of accessories and/or equipment carried by or in proximity to an automobile.

SUMMARY

Various aspects of the extension of vehicular alarm systems to accessories and/or equipment carried by an automobile are disclosed.

In one aspect, a system for extending a vehicular alarm system to an accessory secured to an automobile or to equipment carried by the automobile (e.g., directly, by way of the accessory, etc.) is disclosed. Such a system is also referred to herein as an "accessory alarm," and may include a base unit and a remote unit.

The remote unit, which may also be referred to as a "slave" unit, is configured to be associated with an accessory or other equipment an individual would like to protect that is secured to, carried by or in proximity to the automobile. Some non-limiting examples of such equipment include a rack (e.g., a ski/snowboard rack, a bike rack, etc.), a cargo box, a toolbox, skis, a snowboard, a surfboard, a bicycle, a tonneau cover, a truck she trailer door, a camper door, equipment sitting on a trailer a boat, a jet ski, a snowmobile, a motorcycle, an all-terrain vehicle (ATV) etc.), a soft top of the automobile, a hard top of the automobile, a spare tire, a tailgate, a gas can carrier, boat equipment or the like. The remote unit may be configured for association with the accessory in a manner that enables a sensor of the remote unit to detect an undesired activity, or a disruption, such as removal or attempted removal of the accessory from the automobile, opening of or an attempt to open the accessory, or removal or attempted removal of equipment from the automobile or from a location in proximity to the automobile (e.g., on a trailer coupled to a trailer hitch on the automobile, etc.). In addition to a sensor, the remote unit may include a wireless communication component configured to receive a signal from the sensor and to transmit a signal to the base unit of the system. In some embodiments, the remote unit may also include a camera, which may capture images or video of a person or event that disrupts the accessory or equipment with which the remote unit has been associated.

The base unit is configured to be placed on the automobile and to communicate with the vehicular alarm system in such a way that the base unit can mimic activation of a sensor of the vehicular alarm system and cause the vehicular alarm system to sound or otherwise provide an alarm (e.g., send a signal to a remote device, such as a key fob, smart phone or the like; cause lights on the automobile 40 to flash, etc.). The base unit includes a wireless communication component that is configured to pair with and to receive a signal from the wireless communication component of a remote unit. Upon receiving such a signal, a processing element of the base unit, which may comprise part of the wireless communication component of the base unit, may be configured to actuate a switch of the base unit. Actuation of the switch may, in turn, mimic activation of a sensor (e.g., a hood sensor, a trunk sensor, a door sensor a hatchback sensor, etc.) of a vehicular alarm system, which may cause the vehicular alarm system to sound or otherwise provide an alarm.

In another aspect, this disclosure relates to accessory systems for securing equipment to automobiles. Such a system may include an accessory that is configured to be secured to the automobile, as well as an accessory alarm.

Methods for extending a vehicular alarm system beyond an automobile are also disclosed. Such a method may include extending the vehicular alarm system to accessories that are secured to the automobile, equipment held by the accessories, and equipment carried by the automobile.

Other aspects, as well as features and advantages of various aspects, of the disclosed subject matter will become apparent to those of ordinary skill in the art through consideration of the ensuing description, the accompanying drawings and the appended claims.

DETAILED DESCRIPTION

Figure 1:
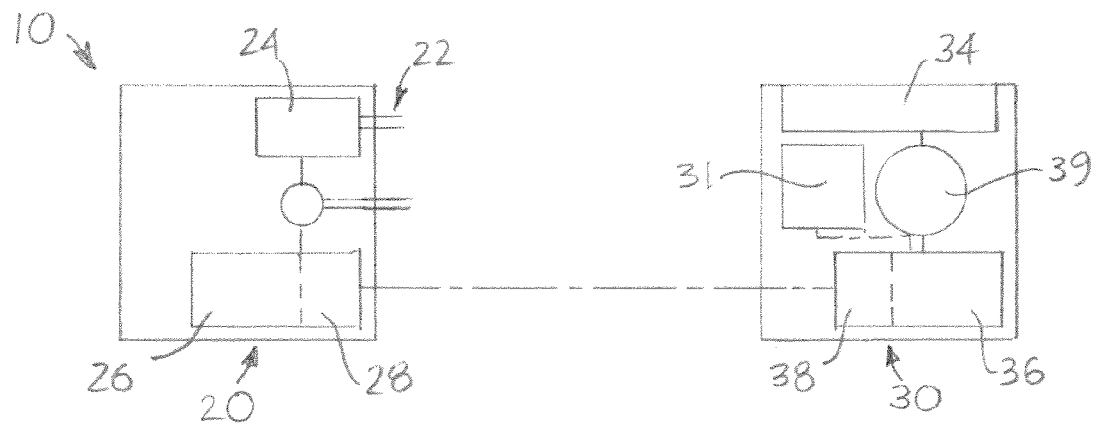
FIG. 1 is a schematic representation of an embodiment of an accessory alarm.
Figure 2:
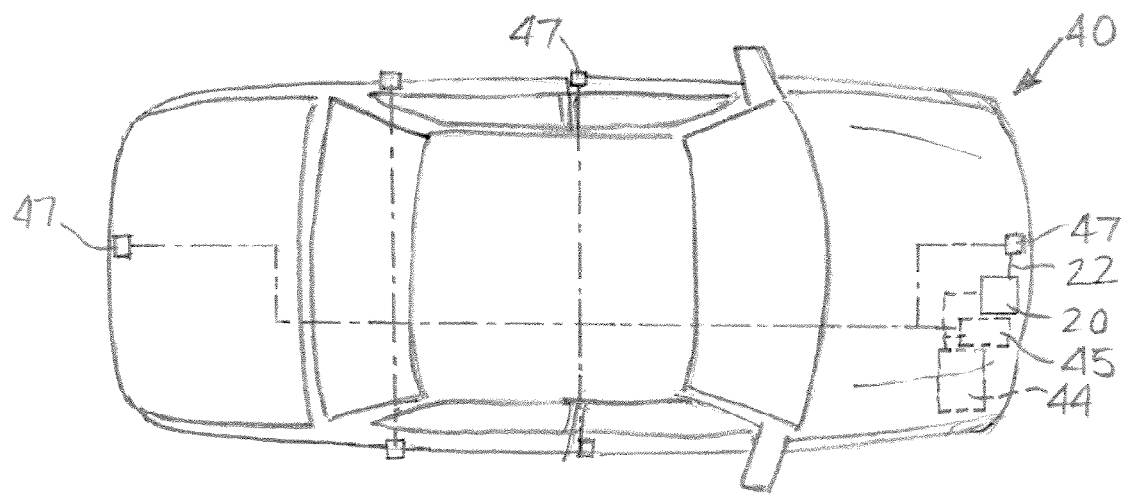
FIG. 2 schematically illustrates an embodiment of a manner in which a base unit of an accessory alarm may integrate with or otherwise be associated with a vehicular alarm system.
Figure 3:
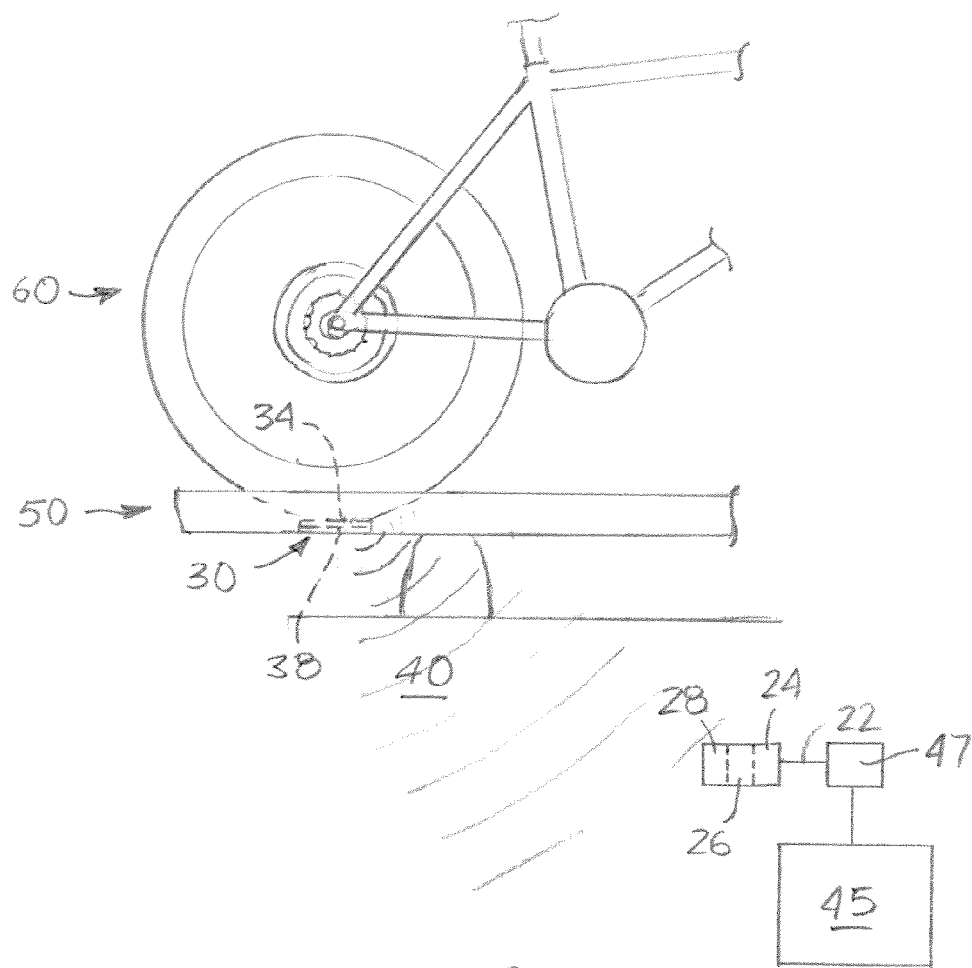
FIG. 3 depicts an embodiment of a manner in which a remote unit of an accessory alarm may be associated with an accessory that has been secured to an automobile and to equipment carried by the accessory, by the automobile and/or otherwise located in proximity to the automobile.

With general reference to FIGS. 1-3, an embodiment of an accessory alarm 10 is depicted. The accessory alarm 10 may include a base unit 20 and one or more remote units 30. The base unit 20 may be configured to be positioned in place on (or in) an automobile 40, and to communicate with the automobile's alarm system, which is also referred to as a "vehicular alarm system" 45. The remote unit 30 may be configured for association with an accessory 50 that has been secured to the automobile 40, with equipment 60 carried by the automobile (e.g., by an accessory 50 that has been secured to the automobile 40, etc.) or with both the accessory 50 and the equipment 60.

Referring to FIG. 1, the base unit 20 of the accessory alarm 10 may include a coupling element 22, a switch 24, a processing element 26 and a wireless communication component 28.

The coupling element 22 of the base unit 20 of the accessory alarm 10 enables communication between the base unit 20 and a vehicular alarm system 45 (FIG. 2). The coupling element 22 may provide for communication between the base unit 20 and the vehicular alarm system 45 in a manner that enables the base unit 20 to function as an existing sensor 47 (FIG. 2) of the vehicular alarm system 45. In some embodiments, the coupling element 22 may be configured to position a switch 24 of the base unit 20 in parallel electrically with the existing sensor 47. In a specific embodiment, the coupling element 22 may comprise wires and associated connectors.

The switch 24 of the base unit 20 may comprise any suitable element (e.g., a switch, a field effect transistor (FET), etc.) with an "off" or "0" state that prevents transmission of signals and an "on" or "1" state that enables transmission of signals. The switch 24 of the base unit 20 may operate under control of a processing element 26 of the base unit 20.

The processing element 26 of the base unit 20 may be programmed to control the state of the switch 24 and to generate and convey a signal to (and through) the switch 24 that mimics activation of the existing sensor 47 (FIG. 2) and, thus, causes the vehicular alarm system 45 (FIG. 2) to sound or otherwise provide an alarm. The processing element 26 may execute these acts when the processing element 26 receives an appropriate signal from a wireless communication component 28 of the base unit 20.

The wireless communication component 28 may comprise a component capable of establishing near-field, or short distance, wireless communication with a wireless communication component 38 of the remote unit 30 of the accessory alarm 10. Without limitation, the wireless communication component 28 of the base unit 20 may comprise a transceiver that communicates by way of the BLUETOOTH® wireless technology standard. The processing element 26 and the processing element 28 may be packaged together or they may comprise the same device (e.g., as a BLUETOOTH® low energy (BLE) processor, an ANT network processor, etc.).

With continued reference to FIG. 1, the remote unit 30 of the accessory alarm 10 may include a sensor 34, a processing element 36, the wireless communication component 38 and a power supply 39. In some embodiments, the remote unit 30 may also include a camera and/or a microphone 31.

The sensor 34 may comprise a switch or any other component (e.g., complementary, electrically conductive fasteners, such as conductive hook and loop elements, etc.) that can detect a change in a physical state. Without limitation, the sensor 34 may be configured to detect a change in pressure (e.g., placement of an object against the sensor 34, removal of an object from the sensor 34, etc.) (e.g., the sensor 34 may comprise a momentary switch, a pin switch, a pressure switch, etc.). Alternatively, the sensor 34 may be configured to detect whether or not an object is placed adjacent to (e.g., in front of, etc.) it (e.g., the sensor may comprise an optical element, etc.).

The sensor 34 may generate a signal and communicate the signal to the processing element 36 when a state of the sensor 34 changes; i.e., when the sensor 34 is activated. Such activation may occur when an object is removed from the sensor 34 or moved away from the sensor 34.

In embodiments where the remote unit 30 includes a camera 31, the camera 31 may be positioned to capture images (e.g., still images, video images, etc.) of an individual or other disturbance that activates the sensor 34. In some embodiments, a microphone 31 may capture audio as the sensor 34 is activated.

Upon receiving one or more signals from the sensor 34, programming of the processing element 36 may cause it to convey each signal to the wireless communication component 38, and to cause the wireless communication component 38 to transmit each signal. In embodiments where the remote unit 30 includes a camera and/or a microphone 31, activation of the sensor 34 may cause the camera and/or the microphone 31 to operate, or the processing element 36 may be programmed to operate the camera and/or the microphone 31 when a signal is received from the sensor 34. Data corresponding to images and/or video captured by the camera 31, which is referred to as "image data," and/or data corresponding to audio captured by the microphone 31, which is referred to as "audio data," may then be communicated back to the processing element 36, which may then convey that image data and/or audio data to the wireless communication component 38. The wireless communication component 38, which may be separate from, packaged with or integrated with (e.g., as a BLUETOOTH® low energy (BLE) processor, an ANT network processor, etc.) the processing element 36 may, of course, be configured to transmit any signals from the sensor 34. In a specific embodiment, the wireless communication component 38 may comprise a transmitter that conveys signals by way of the BLUETOOTH® wireless technology standard. In some embodiments, the wireless communication component 38 of the remote unit 30 and the wireless communication component 28 of the base unit 20 may communicate securely with one another (e.g., without broadcasting their identities, by way of an encrypted protocol, etc.).

The power supply 39 of the base unit 30 may be configured to supply power to other components of the base unit 30, including the sensor 34, the processing element 36 and the wireless communication component 38. The power supply 39 may comprise any suitable type of power supply, including, without limitation, a battery.

Turning now to FIG. 2, an embodiment of a vehicular alarm system 45 that has been extended by way of an accessory alarm 10 is depicted. The vehicular alarm system 45 includes a plurality of existing sensors 47, including, without limitation, door sensors, a trunk or hatchback sensor, a hood sensor, and the like. Each existing sensor 47 may be configured to detect opening of its corresponding element (e.g., a door, a trunk or hatchback, a hood, etc.) of an automobile 40 when the vehicular alarm system 40 is armed. In some embodiments, an existing sensor 47 may comprise a switch.

As indicated previously herein, a base unit 20 of the accessory alarm 10 (FIG. 1) may be associated with (e.g., wired into, etc.) the vehicular alarm system 45 at a location adjacent to an existing sensor 47. Association of the base unit 20 with the existing sensor 47 may enable the switch 24 (FIG. 1) to function in a manner mimics activity by the existing sensor 47. More specifically, a coupling element 22 (FIG. 1) (e.g., wires and associated connectors, etc.) may place the switch 24 in parallel electrically with the existing sensor 47. By mimicking activity of the existing sensor 47, the switch 24 of the base unit 20 may cause, or trigger, the vehicular alarm system 45 to sound or otherwise produce an alarm.

The base unit 20 may be associated with an existing sensor 47 that is located adjacent to a power source 44 (e.g., a battery, etc.) of the automobile 40. For example, the base unit 20 may be placed in an engine compartment 42 of the automobile 40 and, thus, may be associated with a sensor that detects unwanted opening of a hood of the automobile. As another example, when an automobile 40 includes a power source 44 in its trunk or in a compartment near a rear end of the automobile 40, the base unit 20 may be placed in the trunk or near the rear end of the automobile 40, adjacent to a trunk sensor or a hatchback sensor of the automobile 40's vehicular alarm system 45. Placement of the base unit 20 in proximity to a power source 44 may enable the base unit 20 to rely on the power source 44 of the automobile for power, which may eliminate the need for the base unit 20 to include its own power source. Of course, embodiments of base units 20 that are equipped with their own power supplies (e.g., batteries, etc.) are also within the scope of this disclosure.

With the base unit 20 of an accessory alarm 10 integrated into or otherwise in communication with the vehicular alarm system 45, the base unit 20 may monitor activity by one or more remote units 30 (FIG. 1) with wireless communication components 38 (FIG. 1) that have been wirelessly coupled to the wireless communication component 28 (FIG. 1) of the base unit 20.

FIG. 3 illustrates an embodiment of the manner in which a remote unit 30 of an accessory alarm 10, which has been wirelessly coupled to the base unit 20 of the accessory alarm 10, may be used to detect a disturbance of an accessory 50 or equipment 60 and to cause the vehicular alarm system 45 to sound or otherwise provide an alarm.

In the illustrated embodiment, the remote unit 30 may be placed at an inconspicuous location, such as between an accessory 50 (e.g., a rack, as illustrated, a cargo box, a toolbox, a trailer, etc.) that has been secured to an automobile 40 and equipment 60 (e.g., a bike, skis, a snowboard, all-terrain vehicles (ATVs), motorcycles, watercraft, snowmobiles, etc.) carried by the accessory 50. More specifically, FIG. 3 shows use of the remote unit 30 in conjunction with a bike rack and, even more specifically, placement of the remote unit 30 in a receptacle for a bike tire, with the sensor 34 of the remote unit 30 positioned to detect whether or not a bike tire has been received by the receptacle. Of course, a remote unit 30 and its sensor 34 may also be configured to be positioned in a manner that enables detection of any attempt to remove an accessory 50 (e.g., a rack, as illustrated, a cargo box, a toolbox, a trailer, etc.) or equipment 60 (e.g., a spare tire, a cargo net, etc.) from the automobile 40 while the vehicular alarm system 45 is active. As another alternative, the remote unit and its sensor 34 may be configured to enable detection of any attempt to open an accessory 40 while the vehicular alarm system 45 is active.

Figure 4:
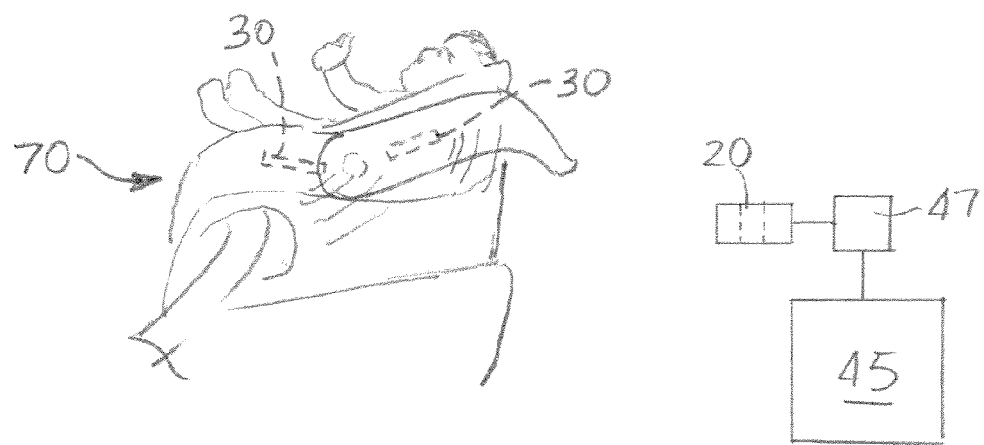
FIG. 4 illustrates use of an accessory alarm to alert an individual when a child remains in an automobile.

Referring now to FIG. 4, the remote unit 30 of an accessory alarm 10 may also be used within the interior of an automobile 40 (FIG. 2). In a specific, but non-limiting embodiment, the remote unit 30 may be associated with a seat 70 within the automobile 40 (e.g., a seat of the automobile, an infant car seat, a child car seat, etc.) in such a way that its sensor 34 (FIG. 1) may detect whether or not the seat 70 is occupied. If the seat 70 is occupied when the vehicular alarm system 45 (FIG. 2) is active, the sensor 34 may generate a signal that is conveyed to the processing element 36 (FIG. 1) of the remote unit 30, through the wireless communication component 38 (FIG. 1) of the remote unit 30, to the base unit 20 (FIG. 2), which may cause the vehicular alarm system 45 to sound an alarm, prevent activation of the vehicular alarm system 45 and/or prevent doors of the automobile 40 from locking.

With returned reference to FIGS. 1 and 3, upon wirelessly coupling the remote unit 30 to the base unit 20 of the accessory alarm 10 and activation of the vehicular alarm system 45, the sensor 34 of the remote unit 30 can detect a disturbance or other undesired activity, such as removal of equipment 60 from an accessory 50 (e.g., removal of a bike tire from the receptacle of the bike rack shown in FIG. 3, etc.) or from the automobile 40, opening of the accessory 50 (e.g., a cargo box, a toolbox, a component of a rack, etc.) or removal of the accessory 50 from the automobile 40. More specifically, the processing element 26 of the base unit 20 of the accessory alarm 10 may monitor activation of the sensor 34 of the remote unit 30 through the wireless communication components 38 and 28 of the remote unit 30 and the base unit 20, respectively. Such monitoring continues if the sensor 34 is not activated; i.e., if no undesired activity is detected. However, if the sensor 34 does detect undesired activity, the processing element 26 of the base unit 20 will actuate the switch 24 of the base unit 20, which will in turn cause the vehicular alarm system 45 to sound or otherwise provide an alarm (e.g., send a signal to a remote device, such as a key fob, smart phone or the like; cause lights on the automobile 40 to flash, etc.).

In embodiments where the remote unit 30 includes a camera and/or the microphone 31, activation of the sensor 34 may also result in operation of the camera and/or the microphone 31, which may transmit image data and/or audio data to the processing element 36. The processing element 36 may then cause the image data and/or the audio data to be stored for subsequent retrieval, or convey the image data and/or the audio data to the wireless communication component 38, which may transmit the image data and/or the audio data. In some embodiments, image data and/or audio data transmitted by the wireless communication component 38 may be received by an external device (e.g., a mobile telephone, a tablet computer, etc.). Alternatively, image data and/or audio data transmitted by the wireless communication component 38 of the remote unit 30 may be received by the wireless communication component 28 of the base unit 20. The wireless communication component 28 may then communicate the image data and/or the audio data to the processing element 26 of the base unit 20, which processing element 26 may be programmed to store the image data and/or the audio data for subsequent retrieval and/or to convey the image data and/or the audio data to an appropriate device (e.g., a mobile phone, a tablet computer, etc.).

Although the foregoing disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

What is claimed:

1. A system for extending a vehicular alarm system to an accessory carried by an automobile, comprising:
   a base unit, including:
   wiring for electrically coupling to and communicating with a sensor of the vehicular alarm system of the automobile;
   a switch in communication with the wiring and the sensor of the vehicular alarm system, the switch capable of mimicking an action that activates the sensor of the vehicular alarm system; and a wireless communication component in communication with the switch and capable of causing the switch to mimic the action that activates the sensor of the vehicular alarm system; and a remote unit capable of use in conjunction with an accessory carried by the automobile, the remote unit including:

a sensor for determining a state of the accessory carried by the automobile; and a wireless communication component in communication with the sensor and capable of communicating data regarding the state of the accessory to the wireless communication component of the base unit in a manner that causes the wireless communication component of the base unit to cause the switch of the base unit to mimic the action that activates the sensor of the vehicular alarm system.

2. The system of claim 1, wherein the base unit is capable of connecting with a hood sensor, a trunk sensor, a door sensor, or a hatchback sensor of the vehicular alarm system.

3. The system of claim 2, wherein the base unit is further capable of connecting to a battery of the automobile.

4. The system of claim 1, wherein the remote unit is capable of use with a rack, a trailer, a camper shell, or a tonneau cover secured to the automobile.

5. The system of claim 4, wherein the sensor of the remote unit is capable of detecting removal of the accessory from the automobile.

6. The system of claim 4, wherein the sensor of the remote unit is capable of detecting opening of the accessory.

7. The system of claim 4, wherein the sensor of the remote unit is capable of detecting removal of equipment from the accessory.

8. The system of claim 1, wherein the remote unit is capable of use cargo box secured to the automobile.

9. The system of claim 8, wherein the sensor of the remote unit is capable of detecting removal of the cargo box from the automobile.

10. The system of claim 8, wherein the sensor of the remote unit is capable of detecting opening of the cargo box.

11. The system of claim 1, wherein the remote unit is capable of use with a toolbox secured the automobile.

12. The system of claim 11, wherein the sensor of the remote unit is capable of detecting removal of the toolbox from the automobile.

13. The system of claim 11, wherein the sensor of the remote unit is capable of detecting opening of the toolbox.

14. An accessory system for use in securing equipment to an automobile, comprising:

an accessory secured to the automobile; and an accessory alarm capable of extending a vehicular alarm system of the automobile by way of a base unit capable of being electrically coupled to the vehicular alarm system, the base unit including a wireless communication component capable of communicating with the accessory alarm, the accessory alarm including:

a remote unit capable of use in conjunction with the accessory, the remote unit including:

a sensor for determining a state of the accessory carried by the automobile; and a wireless communication component in communication with the sensor and capable of detecting data regarding the state of the accessory to the wireless communication component of the base unit in communication with an existing sensor of the vehicular alarm system in a manner that causes the wireless communication component of the base unit to cause a switch of the base unit to mimic an action that activates the existing sensor of the vehicular alarm system.

15. The accessory system of claim 14, wherein the accessory alarm further includes:

the base unit.

16. The accessory system of claim 15, wherein the base unit of the accessory alarm includes:

the switch in communication with the existing sensor of the vehicular alarm system, the switch capable of mimicking an action that activates the existing sensor of the vehicular alarm system; and the wireless communication component in communication with the switch and capable of receiving data regarding the state of the accessory from the wireless communication component of the remote unit and capable of causing the switch to mimic the action that activates the existing sensor of the vehicular alarm system.

17. The accessory system of claim 16, wherein the switch of the base unit of the accessory alarm is wired to the vehicular alarm system in parallel with the existing sensor.

18. The accessory system of claim 14, wherein the switch of the remote unit of the accessory alarm is capable of detecting removal of the accessory from the automobile.

19. The accessory system of claim 14, wherein the switch of the remote unit of the accessory alarm is capable of detecting removal of equipment from the accessory or opening of the accessory.

20. The accessory system of claim 14, wherein the accessory comprises a rack, a ski/snowboard rack, a bike rack, a cargo box or a toolbox.

21. A method for extending a vehicular alarm system to an accessory secured to an automobile, comprising:

placing a base unit of an accessory alarm in communication with a sensor of the vehicular alarm system of the automobile in a manner that enables the base unit to mimic activation of the sensor of the vehicular alarm system, including electrically coupling the base unit to the vehicular alarm system in parallel with the sensor of the vehicular alarm system;

associating a remote unit of the accessory alarm with the accessory that has been secured to the automobile;

activating the remote unit; and monitoring activity of the remote unit with the base unit.

22. The method of claim 21, wherein placing the base unit of the accessory alarm in communication with the sensor of the vehicular alarm system comprises wiring the base unit to the vehicular alarm system.

23. The method of claim 21, wherein associating the remote unit of the accessory alarm with the accessory comprises associating the remote unit of the accessory alarm with the accessory in such a way that the remote unit will detect removal of the accessory from the automobile.

24. The method of claim 21, wherein associating the remote unit of the accessory alarm with the accessory comprises associating the remote unit of the accessory alarm with the accessory in such a way that the remote unit will detect removal of equipment from the accessory.

25. The method of claim 21, wherein associating the remote unit of the accessory alarm with the accessory comprises associating the remote unit of the accessory alarm with the accessory in such a way that the remote unit will detect opening of the accessory.

26. The method of claim 21, wherein activating the remote unit comprises establishing communication between the remote unit and the base unit.

27. The method of claim 21, wherein activating the remote unit comprises establishing wireless communication between the remote unit and the base unit.

\* \* \* \* \*